(12) United States Patent
Woodman et al.

(10) Patent No.: US 9,053,311 B2
(45) Date of Patent: Jun. 9, 2015

(54) SECURE NETWORK SYSTEM REQUEST SUPPORT VIA A PING REQUEST

(75) Inventors: Larry Woodman, Raleigh, NC (US);
Prarit Bhargava, Raleigh, NC (US);
Andrew D. Gospodarek, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 232 days.

(21) Appl. No.: 13/307,970

(22) Filed: Nov. 30, 2011

(65) Prior Publication Data
US 2013/0139223 A1 May 30, 2013

(51) Int. Cl.
*G06F 7/04* (2006.01)
*G06F 21/33* (2013.01)
*G06F 21/42* (2013.01)

(52) U.S. Cl.
CPC ............... *G06F 21/33* (2013.01); *G06F 21/42* (2013.01)

(58) Field of Classification Search
CPC .................................. G06F 21/33; G06F 21/42
USPC ....................... 726/4, 5, 6; 709/217
See application file for complete search history.

(56) References Cited

U.S. PATENT DOCUMENTS

| | | | |
|---|---|---|---|
| 6,598,094 B1 * | 7/2003 | Wollrath et al. ............... 719/330 |
| 6,785,724 B1 * | 8/2004 | Drainville et al. ............ 709/227 |
| 7,016,955 B2 * | 3/2006 | Martin et al. ................. 709/224 |
| 7,043,357 B1 * | 5/2006 | Stankoulov et al. .......... 701/446 |
| 7,359,983 B1 * | 4/2008 | Maufer et al. ................. 709/236 |
| 7,454,480 B2 * | 11/2008 | Labio et al. ................... 709/217 |
| 7,543,049 B2 * | 6/2009 | Fabre ............................ 709/222 |
| 7,729,314 B2 * | 6/2010 | Siddiqi et al. ................. 370/331 |
| 7,940,757 B2 * | 5/2011 | Sherman et al. .............. 370/389 |
| 8,018,973 B2 * | 9/2011 | Ryu et al. ...................... 370/508 |
| 8,031,672 B2 * | 10/2011 | Balaji et al. ................... 370/331 |
| 8,117,268 B2 * | 2/2012 | Jablokov et al. .............. 709/206 |
| 8,224,401 B1 * | 7/2012 | Schlichter ..................... 455/574 |
| 8,661,101 B2 * | 2/2014 | Chen et al. .................... 709/221 |
| 2002/0046348 A1 * | 4/2002 | Brustoloni ..................... 713/201 |
| 2002/0169953 A1 * | 11/2002 | Moharram et al. ........... 713/151 |
| 2003/0046388 A1 * | 3/2003 | Milliken ........................ 709/224 |
| 2003/0046586 A1 * | 3/2003 | Bheemarasetti et al. ...... 713/201 |
| 2004/0144236 A1 * | 7/2004 | Hiratsuka ........................ 84/609 |
| 2004/0210630 A1 * | 10/2004 | Simonnet et al. ............. 709/203 |
| 2005/0111487 A1 * | 5/2005 | Matta et al. ................... 370/468 |
| 2006/0017969 A1 * | 1/2006 | Ly et al. ........................ 358/1.15 |
| 2006/0069762 A1 * | 3/2006 | Fabre ............................ 709/223 |
| 2006/0288289 A1 * | 12/2006 | Im ................................. 715/716 |
| 2007/0040667 A1 * | 2/2007 | Shrode et al. ................. 340/502 |
| 2008/0137659 A1 * | 6/2008 | Levy-Abegnoli et al. .... 370/392 |
| 2009/0109857 A1 * | 4/2009 | Statia et al. ................... 370/241 |
| 2009/0138703 A1 * | 5/2009 | Schneider ..................... 713/155 |
| 2009/0279426 A1 * | 11/2009 | Mangal ......................... 370/218 |
| 2010/0058052 A1 * | 3/2010 | Bartels et al. ................. 713/153 |
| 2010/0110899 A1 * | 5/2010 | Vanzante et al. .............. 370/242 |
| 2010/0274393 A1 * | 10/2010 | Rustad et al. ................. 700/275 |

(Continued)

*Primary Examiner* — Abu Sholeman
(74) *Attorney, Agent, or Firm* — Lowenstein Sandler LLP

(57) ABSTRACT

Methods and systems for secure network system request (sysrq) via Internet Control Message Protocol (ICMP) are described. A remote computing system sends a query over a network to a target computing system and determines whether the target computing system is non-responsive to the query. When the target computing system is non-responsive to the query, the remote computing system sends an ICMP request to the target computing system over the network. The ping request includes a command to be performed by the target computing system and a key to verify authorization to perform the command.

35 Claims, 6 Drawing Sheets

(56) References Cited

U.S. PATENT DOCUMENTS

| | | | |
|---|---|---|---|
| 2011/0170676 A1* | 7/2011 | Casas | 379/88.18 |
| 2011/0191610 A1* | 8/2011 | Agarwal et al. | 713/310 |
| 2011/0191767 A1* | 8/2011 | Pinsky et al. | 717/176 |
| 2011/0264718 A1* | 10/2011 | Chen et al. | 707/831 |
| 2012/0054322 A1* | 3/2012 | Steiner et al. | 709/223 |
| 2012/0088584 A1* | 4/2012 | Mamtani et al. | 463/42 |
| 2012/0166586 A1* | 6/2012 | Sheffi et al. | 709/217 |
| 2012/0254611 A1* | 10/2012 | Fukuda et al. | 713/160 |
| 2012/0311686 A1* | 12/2012 | Medina et al. | 726/7 |
| 2013/0060898 A1* | 3/2013 | Tanaka et al. | 709/217 |
| 2013/0097692 A1* | 4/2013 | Cooper et al. | 726/14 |
| 2013/0198332 A1* | 8/2013 | Van Ackere et al. | 709/217 |

* cited by examiner

SECURE NETWORK SYSTEM REQUEST SUPPORT VIA A PING REQUEST

TECHNICAL FIELD

Embodiments of the present invention relate to debugging, and more specifically, to secure network system request support via a ping request.

BACKGROUND

In some circumstances, a computing system can hang or can lockup in such a way that the computing system is completely unresponsive to keyboard or console input. A hang or freeze typically occurs when either a single computer program or the whole computing system ceases to respond to inputs. Many conventional computing systems provide the user with a means to terminate a hung program without rebooting or logging out. However, in most cases, a common way to recover from a system freeze may be to reboot the machines, such as by power cycling with an on/off or reset button.

There are situations where computing systems are supported remotely. For example, a computing system that is non-responsive may be at a customer site and it may be difficult to debug the computing system remotely. There may even be scenarios where debugging a system issue via a console is not feasible or not possible. There are methods for rebooting target machines from a remote computing system, but these methods typically do not allow information to be collected that can be used to diagnose the reasons why the computing system is being unresponsive. In these situations, an administrator may reboot the computing system, hoping that the computing system will be responsive after the reboot.

There are instances where computing systems are non-responsive to console input, but are still responsive to pings on a network interface, such as ICMP echo request packets. Pings are used to test the reachability of a target computing system on an internet protocol (IP) network and to measure the round-trip time for messages sent from the originating computing system to the target computing system. Ping operates by sending Internet Control Message Protocol (ICMP) echo request packets to the target computing system and waiting for an ICMP response. In the process it measures the time from transmission to reception and records any packet loss. The results of the test are printed in the form of a statistical summary of the response packets received, including, for example, the minimum, maximum, and mean rout-trip times. ICMP differs from transport protocols such as Transmission Control Protocol (TCP) and User Datagram Protocol (UDP) in that ICMP is not typically used to exchange data between systems. Rather, ICMP is typically used to determine availability or existence of a computing system on a network.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
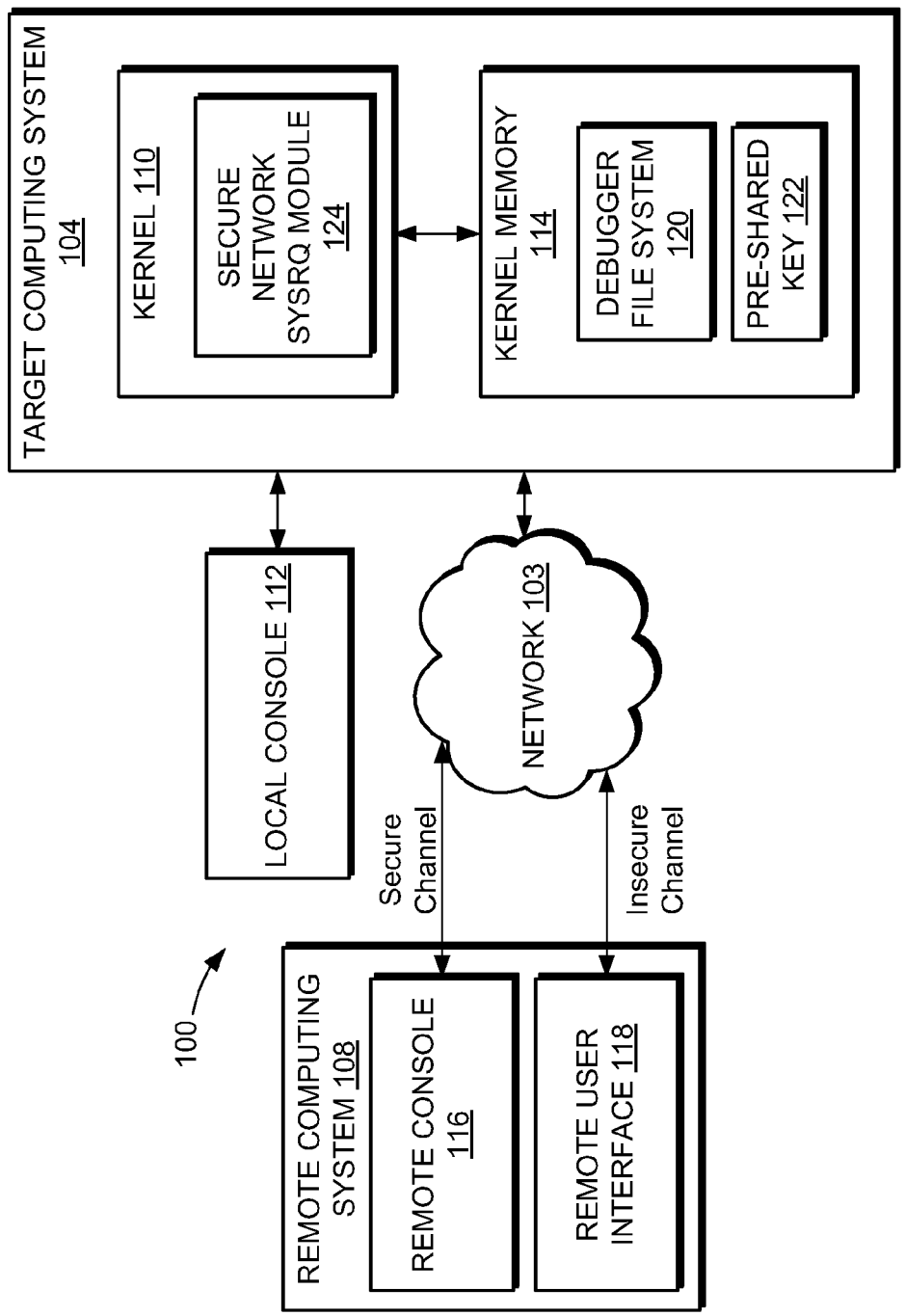
FIG. 1 is a block diagram of an exemplary network architecture in which embodiments of a secure network system request (sysrq) module may operate.

Methods and systems for secure network system request (sysrq) support via a ping request, such as an Internet Control Message Protocol (ICMP) request, are described. A remote computing system sends a query over a network to a target computing system and determines whether the target computing system is non-responsive to the query. When the target computing system is non-responsive to the query, the remote computing system sends a ping request to the target computing system over the network. The ICMP request comprises a command to be performed by the target computing system and a key to verify authorization to perform the command.

Embodiments of the present invention provide an improved system that allows secure network sysrq support of a non-responsive target computing system. As described above, there are scenarios where debugging a system issue via the console is not feasible or not possible. In these situations, the target computing system still responds to a query over a networking interface. The embodiments described herein provide a way to send commands, such as to debug or diagnose the system issue, via pings (e.g., ICMP requests) on the network interface, instead of from the console. The embodiments described herein allow a user to send a command to a target computing system from a remote computing system ping requests via ICMP. ICMP is one of the most simple network protocols and is primarily used to verify the existence of a target computing system or report that the target computing system is unavailable. In some embodiments, the ICMP echo request command is used to send the request for information to the target computing system rather than the specific console access. The embodiments described herein extend an existing protocol, ICMP, such as using ICMP echo request format, for signaling the event (a sysrq event) and optionally providing feedback to indicate event success. Alternatively, other types of ping requests than ICMP requests may be used as would be appreciated by one of ordinary skill in the art having the benefit of this disclosure. Also, unlike conventional approaches that require the core kernel to detect a signal in the core kernel packet-filtering stack, the embodiments described herein use ICMP to send the request for information over the network interface that is still responsive when the target computing system is not responsive to input from a console, for example.

In the following description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the embodiments of the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving," "generating," "communicating," "capturing," "executing," "defining," "specifying," "processing," "providing," "computing," "calculating," "determining," "displaying," "detecting," "sending," "receiving," or the like, refer to the actions and processes of a computing system, or similar electronic computing systems, that manipulates and transforms data represented as physical (e.g., electronic) quantities within the computing system's registers and memories into other data similarly represented as physical quantities within the computing system memories or registers or other such information storage, transmission or display devices.

Embodiments of the present invention also relate to an apparatus for performing the operations herein. This apparatus may be specially constructed for the required purposes, or it may comprise a general-purpose computing system specifically programmed by a computer program stored in the computing system. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

FIG. 1 is a block diagram of exemplary network architecture 100 in which embodiments of a secure network sysrq module 124 may operate. The network architecture 100 may include a target computing system 104 and a remote computing system 108, each connected via a network 103, which may be a private network (e.g., a local area network (LAN), wide area network (WAN), intranet, etc.) or a public network (e.g., the Internet).

The target computing system 104 may be one or more machines including one or more server computers, gateways, or other computing systems, including client machines, such as a desktop computer, laptop computer, server, cellular phone, personal digital assistant (PDA), etc., and server machines, including gateways, server workstations, etc. The remote computing system 108 may be one or more machines, including a desktop computer, laptop computer, server, cellular phone, personal digital assistant (PDA), etc. The remote computing system 108 may also be a server machine as would be appreciated by one of ordinary skill in the art having the benefit of this disclosure. The remote computing system 108 interacts with the target computing system 104 by exchanging messages via standard protocols, e.g., FTP, HTTP, TCP, UDP, ICMP. The remote computing system 108 include a remote console 130 for allowing a user, such as a system administrator, to setup the secure network sysrq module 124, the debugger file system 120, and saving the pre-shared key 122 into kernel memory 114 over a secure channel. In one embodiment, the remote console 130 establishes a secure channel with the target computing system 103 over the network 103, such as using Secure Shell (SSH). In another embodiment, a local console 112 may be used to allow the user to setup the secure network sysrq module 124, the debugger file system 120, and saving the pre-shared key 122 into kernel memory 114 securely. The local console 112 may be a command line interface (CLI) or a graphical user interface (GUI).

The remote computing system 108 may also include a remote user interface 118, such as a command line interface (CLI) or a graphical user interface (GUI), which can be used to send the ICMP request over an insecure channel over the network 103 to a network interface of the target computing system 104. As would be appreciated by one of ordinary skill in the art having the benefit of this disclosure, the ICMP request can be sent over the secure channel as well. It should be noted that the following embodiments are described with respect to ICMP requests, but in other embodiments, other types of ping requests may be used as described above.

The target computing system 104 hosts a kernel 110 in which the secure network sysrq module 124 may operate. The secure network sysrq module 124 is configured to be responsive to ICMP requests received over a network from the remote computing system 108. The secure network sysrq module 124 can be used to diagnose the target computing system 104 when the target computing system 104 is non-responsive. For example, the target computing system 104 is non-responsive to queries sent from the remote computing system 108 or from other devices on the network 103. The secure network sysrq module 124 uses debugger file system 120 and pre-shared key 122 in kernel memory 114 to collect and output system state information to diagnose the target computing system 104. In one embodiment, the debugger file system 120 is debugfs, which is a filesystem that operates as a kernel-space user-space interface. Debugfs may be used as a simple RAM-based file system designated for debugging purposes. Debugfs makes kernel information available to the user space. In one embodiment, the debugger file system 120 can be configured by an administrator to configure the target computing system 104 for a remote sysrq over the network 103. For example, the administrator from a local console 112 can perform the following script to setup the debugger file system 120 and to save a pre-shared key 122 in the kernel memory 114.

```
mount -t debugfs none /sys/kernel/debug/
echo 1 > /proc/sys/kernel/sysrq
echo <hex digit val> > /sys/kernel/debug/network_sysrq_magic
echo 1 > /sys/kernel/debug/network_sysrq_enable
```

In another embodiment, the administrator can use a remote console 116, in which the administrator establishes a secure channel over the network 103 to setup the debugger file system 120 and to save the pre-shared key 122 in the kernel memory 114. The same script can be used over the secure channel, for example, using a SSH console.

After the pre-shared key 122 is saved into kernel memory 114, the administrator can subsequently determine whether the target computing system 104 is non-responsive to queries from the local console 112, the remote console 116, or from other devices on the network 103. In response, the administrator can send the ICMP request over a network interface via ICMP even though the target computing system 104 is non-responsive to input from the local console 112 or the remote console 116. The ICMP request includes the pre-shared key and a command to be performed by the target computing system 104. The target computing system 104 uses the pre-shared key to verify authorization to perform the command. In one embodiment, the ICMP request is a ICMP echo request packet that signals a remote system request (sysrq) event and the command to be performed by the target computing system 104 for the remote sysrq event. In response, the target computing system 104 may send an ICMP response, such as a ICMP echo reply packet, to indicate a success of the remote sysrq event. The command sent in the ICMP request may request various types of operations, such as operations used to collect information about the target computing system 104, the kernel 110, kernel memory 114, processes executing on the target computing system 104, statistical information, or any other information that can be used for diagnosing the non-responsive target computing system 104. Various examples of the commands are described below with respect to FIGS. 3A, 3B, and 4.

In one embodiment, the administrator on the remote computing system 108, such as on the remote user interface 118, can input the following script to send the ICMP request to the target computing system.

```
ping -c 1 -p <up to 30 hex digit val><hex val of sysrq>
<target_system_name>
```

The ping can specify a command key, such as 'c', which designates a command to be performed by the target computing system 104 when the pre-shared key of the ping matches the pre-shared key 122 stored in kernel memory 114. Exemplary command keys are described below with respect to FIG. 4.

The target computing system 104 may include one or more data stores (not shown). The data stores can be one or more centralized data repositories that store application data, system data, configuration data, or the like. The data stores may be local or remote data stores and may be single or multiple data structures (databases, repositories, files, etc.) residing on one or more mass storage devices, such as magnetic or optical storage based disks, tapes or hard drives.

Figure 2:
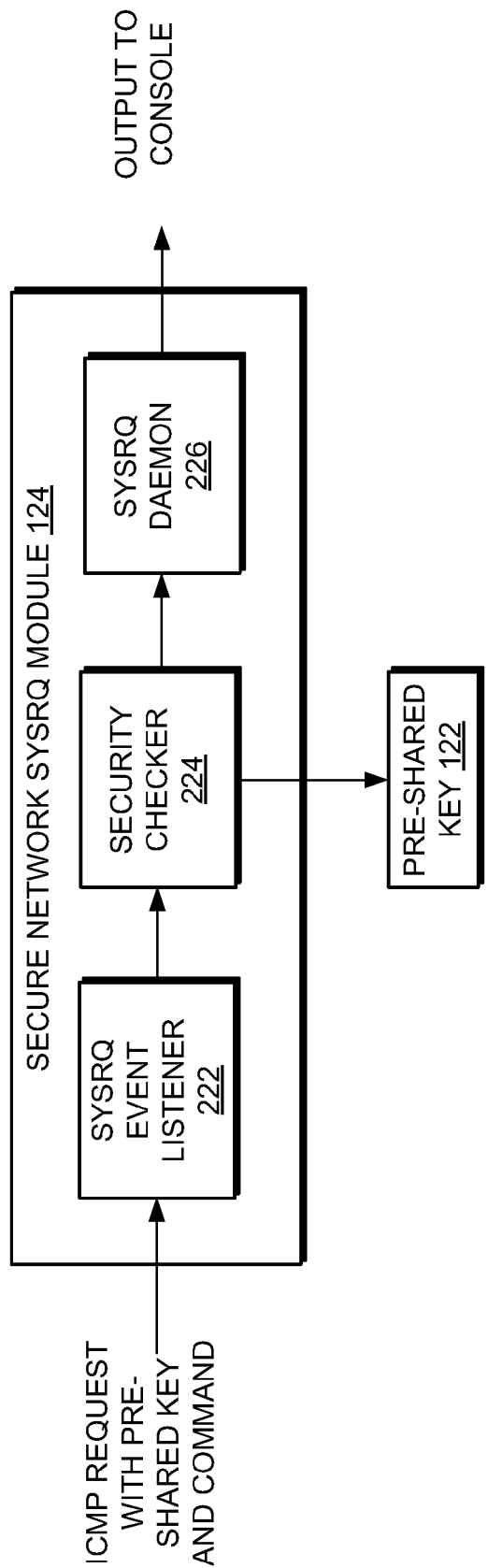
FIG. 2 is a block diagram of the secure network sysrq module of FIG. 1 according to one embodiment.

FIG. 2 is a block diagram of the secure network sysrq module 124 of FIG. 1 according to one embodiment. In the depicted embodiment, the secure network sysrq module 124 includes a sysrq event listener 222, a security checker 224, and sysrq daemon 226. When the target computing system 104 is non-responsive, an administrator can send ICMP requests to the secure network sysrq module 124. The sysrq event listener 222 can detect when an ICMP request is received over a network interface. As described above, the target computing system 104 may be unresponsive to input from a console, but is still responsive to pings on the network interface. When the sysrq event listener 222 detects the ICMP request, the security checker 224 compares the pre-shared key sent in the ICMP request with the pre-shared key 122 stored at the target computing system 104. The pre-shared key 122 may be stored in kernel memory 114. In another embodiment, the pre-shared key 122 can be stored in a file in memory of the target computing system 104. The pre-shared key 122 can be saved into the target computing system 104 using a local console or a remote console, as described above. In another embodiment, the pre-shared key 122 is stored in memory when the kernel is compiled. Alternatively, the pre-shared key 122 may be made available to the target computing system 104 using other techniques as would be appreciated by one of ordinary skill in the art having the benefit of this disclosure. If the security checker 224 determines that the pre-shared keys match, the ICMP request is verified, and the sysrq daemon 226 performs the command specified in the ICMP request. The command may be any type of operation as described herein, such as operations to collect information about the target computing system 104 for diagnostic purposes. The sysrq daemon 226 can output the collected information to a console, such as local console 112, remote console 116, or the like. In another embodiment, the sysrq daemon 226 can save the collected information into a log file. In another embodiment, the sysrq daemon 226 can encrypt the collected information and send the information to the remote computing system 108. This information may be used to diagnose the non-responsiveness of the target computing system. The operations of the secure network sysrq module 124 are described in more detail below with respect to FIGS. 3A, 3B, and 4.

Figure 3A:
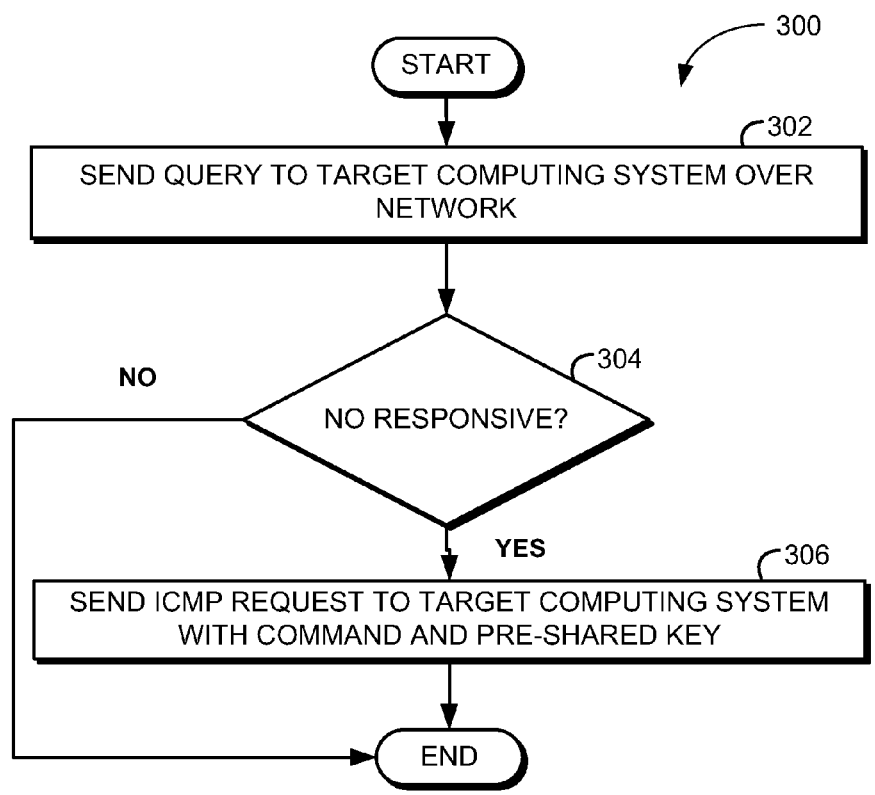
FIG. 3A is a flow diagram of one embodiment for a method of sending an ICMP request with a command and a pre-shared key from a remote computing system to a target computing system.

FIG. 3A is a flow diagram of one embodiment for a method 300 of sending an ICMP request with a command and a pre-shared key from a remote computing system to a target computing system. The method 300 is performed by processing logic that may comprise hardware (circuitry, dedicated logic, etc.), software (such as is run on a general purpose computing system or a dedicated machine), firmware (embedded software), or any combination thereof. In one embodiment, the remote computing system 108 of FIG. 1 performs the method 300. Alternatively, other components of the target computing system 104, the remote computing system 108, or both can perform some or all of the operations of method 300.

Referring to FIG. 3A, processing logic begins with sending a query to a target computing system over a network (block 302). Next, the processing logic determines whether the target computing system is non-responsive to the query (block 304). As described herein, the target computing system can hang or can lockup in such a way that the target computing system is completely unresponsive to keyboard or console input, but is still responsive to pings. If at block 304 the target computing system is non-responsive, the processing logic sends an ICMP request to the target computing system over the network (block 306), and the method 300 ends. The ICMP request includes a pre-shared key and a command to be performed by the target computing system. The target computing system uses the pre-shared key to verify authorization to perform the command. However, if at block 304 the target computing system is responsive, the processing logic does not send the ICMP request, and the method 300 ends. The pre-shared key may be a digital value stored in memory of a debugger file system (debugfs). In another embodiment, the pre-shared key can be a password, a passphrase, or other key that is stored in a file on the target computing system.

In one embodiment at block 306, the processing logic sends a ICMP echo request packet to signal a sysrq event and the command to be performed by the target computing system for the remote sysrq event. The pre-shared key and command can be part of the payload of the ICMP echo request packet. In another embodiment, the processing logic receives an ICMP response, such as a ICMP echo reply packet, that indicates a success of the remote sysrq event.

The command may request various types of operations to control the target computing system despite the target computing system being non-responsive. These commands may be used to debug the target computing system, processes executing on the target system, or other aspects of the target computing system. In one embodiment, the command to be performed by the target computing system is used to capture system state information of the target computing system. In another embodiment, the command is a remote system request (sysrq) event. In another embodiment, the command is a command key that causes the target computing system to perform a kernel execution (kexec) reboot to permit system state information of the target computing system to be output to a console. This can be done to facilitate a crash dump of system state information of the target computing system. In another embodiment, the command is a command key that cause the target computing system to output current registers and flags of the target computing system to a console. In another embodiment, the command is a command key that cause the target computing system to output memory information to a console. In another embodiment, the command is a command key that causes the target computing system to terminate a process executing on the target computing system. Alternatively, the command may be other command keys.

The following list includes a list of command keys that could be used in different embodiments:

'b'—Will immediately reboot the system without syncing or unmounting your disks.
'c'—Will perform a system crash by a NULL pointer dereference. A crash dump will be taken if configured.
'd'—Shows all locks that are held.
'e'—Send a SIGTERM to all processes, except for init.
'f'—Will call oom_kill to kill a memory hog process.
'g'—Used by kgdb (kernel debugger)
'h'—Will display help (actually any other key than those listed here will display help. but 'h' is easy to remember
'i'—Send a SIGKILL to all processes, except for init.
'j'—Forcibly "Just thaw it"—filesystems frozen by the FIFREEZE ioctl.
'k'—Secure Access Key (SAK) Kills all programs on the current virtual console.
'l'—Shows a stack backtrace for all active CPUs.
'm'—Will dump current memory info to your console.
'n'—Used to make RT tasks nice-able
'o'—Will shut your system off (if configured and supported).
'p'—Will dump the current registers and flags to your console.
'q'—Will dump per CPU lists of all armed hrtimers (but NOT regular timer_list timers) and detailed information about all clockevent devices.
'r'—Turns off keyboard raw mode and sets it to XLATE.
's'—Will attempt to sync all mounted filesystems.
't'—Will dump a list of current tasks and their information to your console.
'u'—Will attempt to remount all mounted filesystems read-only.
'v'—Forcefully restores frame buffer console 'v'—Causes ETM buffer dump [ARM-specific]
'w'—Dumps tasks that are in uninterruptable (blocked) state.
'x'—Used by xmon interface on ppc/powerpc platforms.
'y'—Show global CPU Registers [SPARC-64 specific]
'z'—Dump the ftrace buffer '0'-'9'—Sets the console log level, controlling which kernel messages will be printed to your console. ('0', for example would make it so that only emergency messages like PANICs or OOPSes would make it to your console.)

The following descriptions provides how some of these command keys can be used. The command key 'r' for un'R'aw may be used when your X server or a svgalib program crashes. The command key 'k'' for sa'K' (Secure Access Key) is useful when you want to be sure there is no trojan program running at console which could grab your password when you would try to login. It will kill all programs on given console, thus letting you make sure that the login prompt you see is actually the one from init, not some trojan program. It should be noted that in its true form it is not a true SAK like the one in a c2 compliant system, and it should not be mistaken as such. It seems others find it useful as (System Attention Key) which is useful when you want to exit a program that will not let you switch consoles (e.g., an X or a svgalib program). The command key 'b' for re'B'oot is good when you're unable to shut down. One could also use the command key 's' for 'S'ync and the command key 'u' for 'U'mount before the command key 'b'. The command key 'c' for 'C'rash can be used to manually trigger a crashdump when the system is hung. Note that this just triggers a crash if there is no dump mechanism available. The command key 's' for 'S'ync is great when your system is locked up, it allows you to sync your disks and will certainly lessen the chance of data loss and fscking. Note that the sync hasn't taken place until you see the "OK" and "Done" appear on the screen. If the kernel is really in strife, you may not ever get the OK or Done message. The command key 'u' for 'U'mount is basically useful in the same ways as 'S'ync. Generally the command keys 'S'ync, 'U'mount, then re'B'oot can be used when the system locks and can save from fsck. Again, the unmount (remount read-only) hasn't taken place until you see the "OK" and "Done" message appear on the screen. The loglevels '0'-'9' are useful when your console is being flooded with kernel messages you do not want to see. Selecting '0' will prevent all but the most urgent kernel messages from reaching your console, although they will still be logged if syslogd/kogd are active. The command keys 'e' for t'E'rm and 'I' for k'I'll are useful if you have some sort of runaway process you are unable to kill any other way. The command key 'j' for "hist thaw it" is useful if your system becomes unresponsive due to a frozen (probably root) filesystem via the FIFREEZE ioctl.

In other embodiments, other command keys or sysrq events can be added to the module as would be appreciated by one of ordinary skill in the art having the benefit of this disclosure.

Figure 3B:
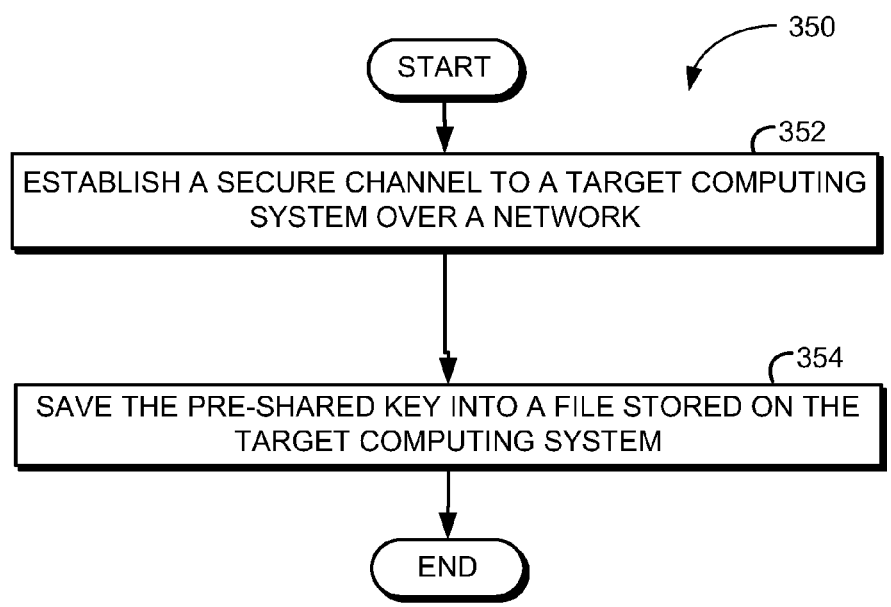
FIG. 3B is a flow diagram of one embodiment for a method of saving a pre-shared key into a file stored on the target computing system.

FIG. 3B is a flow diagram of one embodiment for a method 350 of saving a pre-shared key into a file stored on the target computing system. The method 350 is performed by processing logic that may comprise hardware (circuitry, dedicated logic, etc.), software (such as is run on a general purpose computing system or a dedicated machine), firmware (embedded software), or any combination thereof. In one embodiment, the remote computing system 108 of FIG. 1 performs the method 300. Alternatively, other components of the target computing system 104, the remote computing system 108, or both can perform some or all of the operations of method 300.

Referring to FIG. 3B, processing logic begins with establishing a secure channel to a target computing system over a network (block 352). In one embodiment, the processing logic establishes a secure channel by establishing a secure shell (SSH) channel with the target computing system. This allows a user of the remote computing system to login in over a secure connection to perform operations, such as saving the pre-shared key into a file of the target computing system. At block 354, processing logic saves the pre-shared key into a file stored on the target computing system over the secure channel, and the method ends. In this embodiment, the user can use the SSH channel to save the pre-shared key at the target computing system. Alternatively, a user may use a local console or a keyboard at the target computing system to securely enter the pre-shared key into memory, such as kernel memory of the target computing system. As described below with respect to FIG. 4, once the pre-shared key is stored at the target computing system, a remote computing system can send the ICMP request with the pre-shared key to authorize the target computing system to perform the command being sent in the ICMP request. For example, the pre-shared key stored in the file is compared against the pre-shared key of the ICMP request by the target computing system to verify authorization for the target computing system to perform the command sent in the ICMP request.

In another embodiment, processing logic establishes a secure channel with the target computing system over the network, and then mounts a debugger file system (debugfs) on the target computing system. The processing logic then enables a system request (sysrq) key, stores the pre-shared key in a file of the debugger file system, and enables the pre-shared key. In another embodiment, a root user can configure the target computing system for a secure remote sysrq using a config option, such as CONFIG_SYSRQ_PING, which builds net/ipv4/sysrq-ping.ko. Then the following script can be used to configure the target computing system with the pre-shared key.

```
mount -t debugfs none /sys/kernel/debug/
echo 1 > /proc/sys/kernel/sysrq
echo <hex digit val> > /sys/kernel/debug/network_sysrq_magic
echo 1 > /sys/kernel/debug/network_sysrq_enable
```

Figure 4:
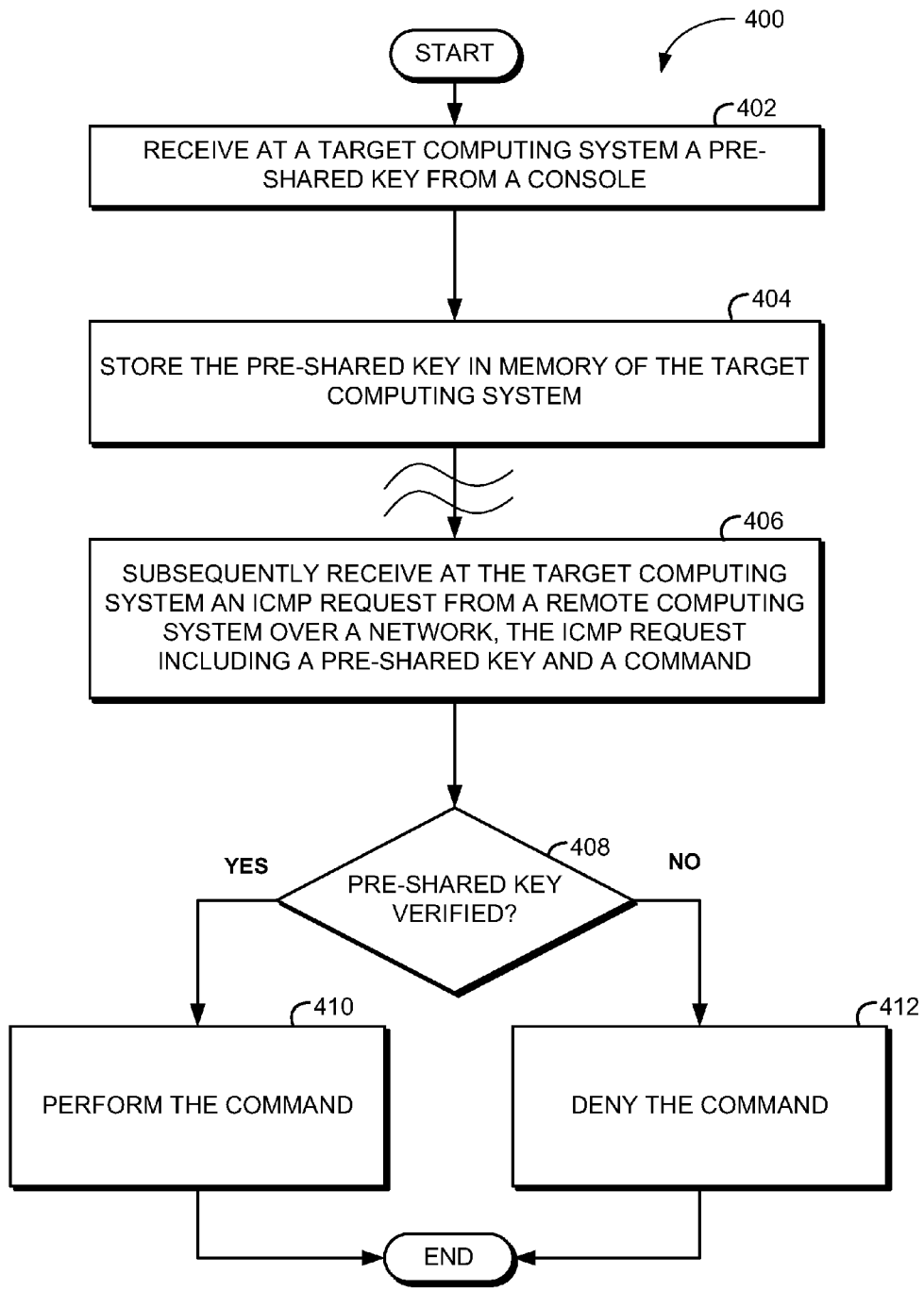
FIG. 4 is a flow diagram of one embodiment for a method of processing an ICMP request with a command and a pre-shared key received from a remote computing system.

In this embodiment, the <hex digit val> is the pre-shared key. In other embodiments, the pre-shared key may be other keys than a hexadecimal digital value as would be appreciated by one of ordinary skill in the art having the benefit of this disclosure. The number in the first echo command can be zero, one, or a number greater than one. The number is a bitmask indicating which features to allow. Possible values are:
0—disable sysrq
1—enable sysrq completely
>1—bitmask of enabled sysrq functions:
2—control of console logging level
4—control of keyboard (SAK, unraw)
8—debugging dumps of processes etc.
16—sync command
32—remount read-only
64—signalling of processes (term, kill, oom-kill)
128—reboot/poweroff
256—nicing of all RT tasks FIG. 4 is a flow diagram of one embodiment for a method 400 of processing an ICMP request with a command and a pre-shared key received from a remote computing system. The method 400 is performed by processing logic that may comprise hardware (circuitry, dedicated logic, etc.), software (such as is run on a general purpose computing system or a dedicated machine), firmware (embedded software), or any combination thereof. In one embodiment, the target computing system 104 of FIG. 1 performs the method 400. Alternatively, other components of the target computing system 104, the remote computing system 108, or both can perform some or all of the operations of method 400.

Referring to FIG. 4, processing logic begins with receiving a pre-shared key from a console (block 402), and storing the pre-shared key in memory (block 404). In one embodiment, the pre-shared key is saved into memory over a secure channel (e.g., SSH) with a remote computing system. The remote computing system can be the same or a different computing system than the one that sends the ICMP request described below. In another embodiment, the pre-shared key can be stored in memory or in a file in memory when the kernel is compiled. Alternatively, the pre-shared key can be made available to the target computing system in other ways as would be appreciated by one of ordinary skill in the art having the benefit of this disclosure.

Subsequently, the processing logic receives an ICMP request from a remote computing system over a network (block 406). The ICMP request includes a pre-shared key and a command to be performed by the processing logic of the target computing system. The processing logic verifies the pre-shared key of the ICMP request against the pre-shared key stored in memory to authorize the command (block 408). For example, in one embodiment, the processing logic compares the pre-shared key of the ICMP request against the pre-shared key stored in memory. If at block 404 the processing logic verifies the pre-shared key of the ICMP request, the processing logic performs the command (block 410), and the method 400 ends. However, if the processing logic determines that the pre-shared key is not verified or that the ICMP request does not include the pre-shared key, then the processing logic denies the command (block 412), and the method 400 ends.

In one embodiment at block 402, the processing logic receives a ICMP echo request packet to signal a sysrq event and the command to be performed by the target computing system for the remote sysrq event. The pre-shared key and command can be part of the payload of the ICMP echo request packet. In another embodiment, the processing logic sends an ICMP response, such as a ICMP echo reply packet, that indicates a success of the remote sysrq event to the remote computing system.

In one embodiment at block 410, the processing logic performs a kexec reboot, and outputs system state information of the target computing system to the console. In another embodiment at block 410, the processing logic output current registers and flags of the target computing system to the console. In another embodiment at block 410, the processing logic outputs memory information to the console. In another embodiment at block 410, the processing logic terminates a process executing on the target computing system.

In another embodiment before block 402, the processing logic establishes a secure channel with the remote computing system over the network in order to receive and store the pre-shared key. Alternatively, the processing logic may receive the pre-shared key in other manners. For example, the kernel may be compiled with the pre-shared key.

In another embodiment, the processing logic mounts a debugger file system (e.g., debugfs) on the target computing system, and enables a system request (sysrq) key. The processing logic stores the pre-shared key in a file of the debugger file system, and enables the pre-shared key. For example, the script provided above may be used to store the pre-shared key into a file of the target computing system. Saving the pre-shared key may be done from a remote console over a secure channel (e.g., using SSH). Alternatively, these operations may be done by a user on a local console or using input devices of the target computing system as would be appreciated by one of ordinary skill in the art having the benefit of this disclosure.

In another embodiment, after the pre-shared key is stored in the target computing system, a user from a remote computing system on the network can input the following operation to ping the non-responsive target computing system:

```
ping -c 1 -p <up to 30 hex digit val><hex val of sysrq>
<target_system_name>
```

The following is an example of a ping operation.

```
ex) sysrq-m, m is ascii 0x6d
ping -c 1 -p 1623a06f554d46d676d <target_system_name>
```

It should be noted that the network sysrq may be configured to automatically disable after the receipt of the ping, i.e., a single-shot mode. The network sysrq allows the sysrq to be executed over a network using ping. In this case, the steps can be repeated to use the network sysrq again. Alternatively, the network sysrq can be configured to not automatically disable.

Figure 5:
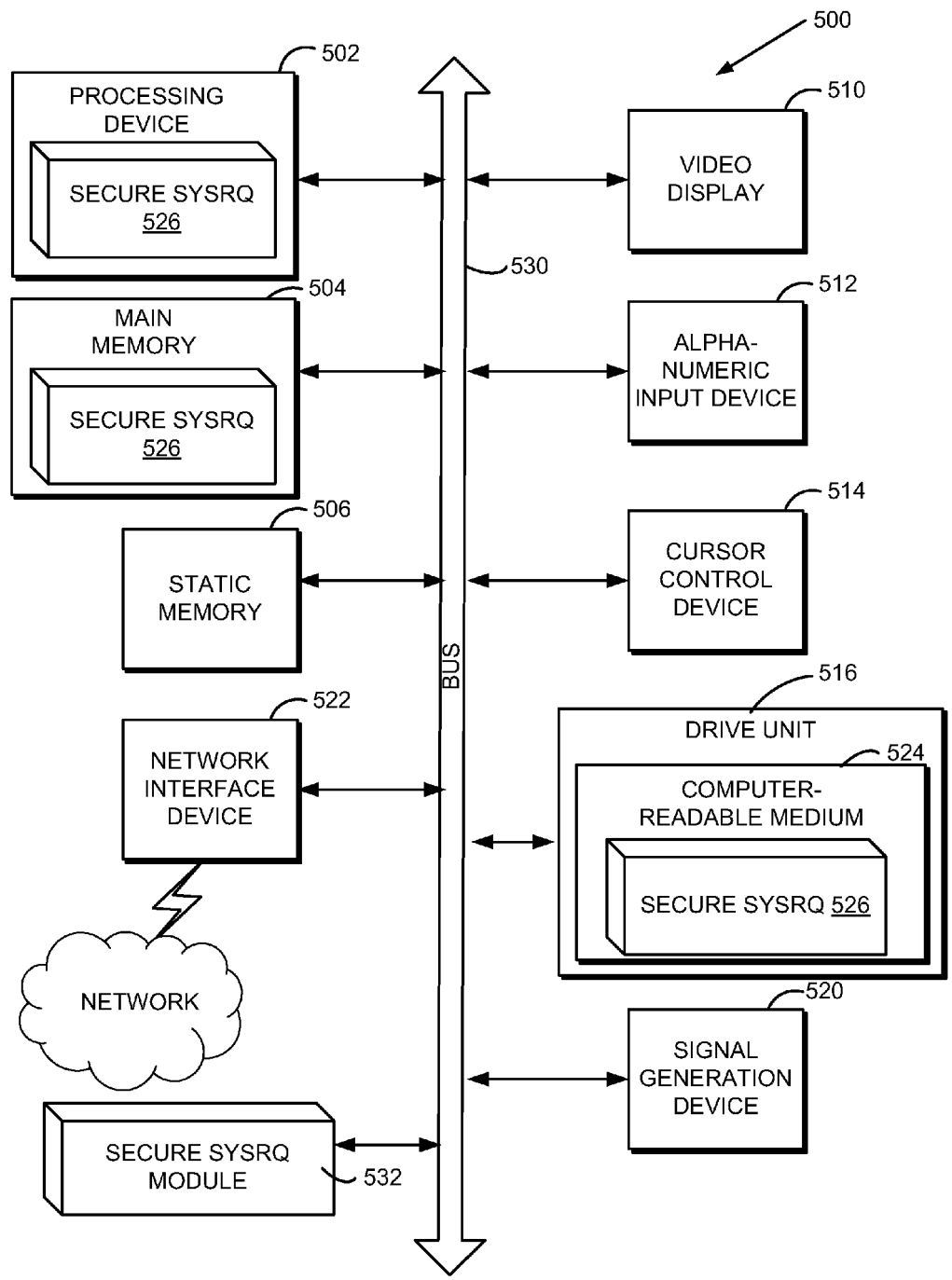
FIG. 5 illustrates a diagrammatic representation of a machine in the exemplary form of a computing system for secure network sysrqs support.

FIG. 5 illustrates a diagrammatic representation of a machine in the exemplary form of a computing system 500 for secure network sysrqs support. Within the computing system 500 is a set of instructions for causing the machine to perform any one or more of the methodologies discussed herein. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a PC, a tablet PC, a set-top-box (STB), a personal data assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein for secure network sysrq support, such as the methods 300, 350 and 400 described above. In one embodiment, the computing system 500 represents various components that may be implemented in the target computing system 104, the remote computing system 108, or both, as described above. Alternatively, the target computing system 104 or the remote computing system 108 may include more or less components as illustrated in the computing system 500.

The exemplary computing system 500 includes a processing device 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, each of which communicate with each other via a bus 530.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic (e.g., secure network sysrq 526) for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable storage medium 524 on which is stored one or more sets of instructions (e.g., secure network sysrq 526) embodying any one or more of the methodologies or functions described herein. The secure network sysrq 526 may also reside, completely or at least partially, within the main memory 504 and/or within the processing device 502 during execution thereof by the computing system 500, the main memory 504 and the processing device 502 also constituting computer-readable storage media. The secure network sysrq 526 may further be transmitted or received over a network via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions.

The secure network sysrq module 532, components, and other features described herein (for example in relation to FIGS. 1-2) can be implemented as discrete hardware components or integrated in the functionality of hardware components such as ASICS, FPGAs, DSPs, or similar devices. The secure network sysrq module 532 may implement operations of secure network sysrq support as described herein with respect to FIGS. 3A-4. In addition, the secure network sysrq module 532 can be implemented as firmware or functional circuitry within hardware devices. Further, the secure network sysrq module 532 can be implemented in any combination hardware devices and software components.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to utilize the invention and various embodiments with various modifications as may be suited to the particular use contemplated.

What is claimed is:
1. A method comprising:
  establishing a secure channel with a target computing system over a network;
  sending, by a processing device at a remote computing system, a query over the established secure channel over the network to the target computing system;
  determining, by the processing device at the remote computing system, whether the target computing system is non-responsive to the query; and when the target computing system is non-responsive to the query, sending a ping request to the target computing system over an insecure channel over the network by the processing device at the remote computing system, wherein the ping request comprises a payload comprising a key and a command to debug the target computing system.

2. The method of claim 1, wherein said sending the ping request comprises sending an Internet Control Message Protocol (ICMP) echo request packet to signal a remote system request (sysrq) event and the command to be performed by the target computing system for the remote sysrq event.

3. The method of claim 2, further comprising receiving an ICMP response that indicates a success of the remote sysrq event.

4. The method of claim 3, wherein said receiving the ICMP response comprises receive an ICMP echo reply packet.

5. The method of claim 1, wherein the command is to capture system state information of the target computing system.

6. The method of claim 1, wherein the command is a remote system request (sysrq) event.

7. The method of claim 1, wherein the command is a command key that causes the target computing system to perform a kernel execution (kexec) reboot to permit system state information of the target computing system to be output to a console associated with the target computing system.

8. The method of claim 1, wherein the command is a command key that causes the target computing system to output current registers and flags of the target computing system to a console associated with the target computing system.

9. The method of claim 1, wherein the command is a command key that causes the target computing system to output memory information to a console associated with the target computing system.

10. The method of claim 1, wherein the command is a command key that causes the target computing system to terminate a process executing on the target computing system.

11. The method of claim 1, wherein the key is a digital value stored in memory of a debugger file system.

12. The method of claim 1, further comprising:
saving the key into a file stored on the target computing system over the secure channel, wherein the key stored in the file is compared against the key of the ping request by the target computing system to verify authorization to perform the command.

13. The method of claim 1, further comprising:
mounting a debugger file system on the target computing system;
enabling a system request (sysrq) key;
storing the key in a file of the debugger file system; and
enabling the key.

14. The method of claim 1, wherein said establishing the secure channel comprises establishing a secure shell (SSH) channel with the target computing system over the network.

15. A method:
receiving, by a processing device at a target computing system, a ping request from a remote computing system over an insecure channel over a network, wherein the ping request comprises a payload comprising a command to debug the target computing system and a key to verify authorization to perform the command;
verifying, by the processing device at the target computing system, the key of the ping request against a key stored in memory to authorize the command; and
performing, by the processing device at the target computing system, the command when the key of the ping request is verified.

16. The method of claim 15, further comprising:
receiving, at the target computing system, the key from a console associated with the target computing system; and
storing the key in the memory of the target computing system.

17. The method of claim 15, wherein said receiving the ping request comprises receiving an Internet Control Message Protocol (ICMP) echo request packet to signal a remote system request (sysrq) event and the command to be performed by the target computing system for the remote sysrq event.

18. The method of claim 17, further comprising sending an ICMP response to indicate a success of the remote sysrq event.

19. The method of claim 15, wherein said performing the command comprises:
performing a kernel execution (kexec) reboot; and
outputting system state information of the target computing system to the console associated with the target computing system.

20. The method of claim 15, wherein said performing the command comprises outputting current registers and flags of the target computing system to the console associated with the target computing system.

21. The method of claim 15, wherein said performing the command comprises outputting memory information to the console associated with the target computing system.

22. The method of claim 15, wherein said performing the command comprises terminating a process executing on the target computing system.

23. The method of claim 15, further comprising:
establishing a secure channel with the remote computing system over the network; and
receiving the key from the remote computing system over the secure channel, and wherein said storing comprises storing the key into a file stored in the memory of the target computing system.

24. The method of claim 15, wherein said verifying comprises comparing the key of the ping request against the key stored in memory to verify authorization to perform the command.

25. The method of claim 15, further comprising:
mounting a debugger file system on the target computing system;
enabling a system request (sysrq) key;
storing the key in a file of the debugger file system; and
enabling the key.

26. The method of claim 23, wherein said establishing the secure channel comprises establishing a secure shell (SSH) channel with the remote computing system over the network.

27. A non-transitory computer readable storage medium including instructions that, when executed by a processing device at a remote computing system, cause the processing device at the remote computing system to:
establish a secure channel with a target computing system over a network;
send, by the processing device at the remote computing system, a query over the established secure channel over the network to the- target computing system;
determine, by the processing device at the remote computing system, whether the target computing system is non-responsive to the query; and when the target computing system is non-responsive to the query, send a ping request to the target computing system over an insecure channel over the network by the processing device at the remote computing system, wherein the ping request comprises a payload comprising a command to debug the target computing system and a key to verify authorization to perform the command.

28. The computer readable storage medium of claim 27, wherein the the processing device at the remote computing system to:
save the key into a file stored on the target computing system over the secure channel, wherein the key stored in the file is compared against the key of the ping request by the target computing system to verify authorization to perform the command.

29. A non-transitory computer readable storage medium including instructions that, when executed by a processing device at a target computing system, cause the processing device at the remote computing system to target computing system to:
receive, by the processing device at the target computing system, a key from a console associated with the target computing system;
store the key in a memory of the target computing system;
subsequently receive, by the processing device at the target computing system, a ping request from a remote computing system over an insecure channel over a network, wherein the ping request comprises a payload comprising a command to debug the target computing system and a key to verify authorization to perform the command;
verify, by the processing device at the target computing system, the key of the ping request against the key stored in memory to authorize the command; and
perform, by the processing device at the target computing system, the command when the key of the ping request is verified.

30. The computer readable storage medium of claim 29, wherein the processing device at the target computer system to:
establish a secure channel to the remote computing system over the network; and
receive the key from the remote computing system over the secure channel, and storing the key into a file stored in the memory of the target computing system.

31. A system, comprising:
a memory; and
a processing device operatively coupled to the memory to to:
receive, at the target computing system, a key from a console associated with the target computing system;
store the key in the memory;
subsequently receive, at the target computing system, a ping request from a remote computing system over an insecure channel over a network, wherein the ping request comprises a payload comprising a command to debug the target computing system and a key to verify authorization to perform the command;
verify the key of the ping request against the key stored in memory to authorize the command; and
perform the command when the key of the ping request is verified.

32. The system of claim 31, the console associated with the target computing system is a remote console.

33. The system of claim 32, wherein the processing device is to receive the key over a secure channel between the remote console and the target computing system.

34. A method comprising:
establishing, by a processing device at a remote computing system a secure channel with a target computing system over a network;
communicating, by the processing device at the remote computing system, with the target computing system over the established secure channel over the network; and
sending, by the processing device at the remote computing system, a ping request to the target computing system over an insecure channel over the network, wherein the ping request comprises a payload comprising a key and a command to debug the target computing system.

35. The method of claim 34, wherein said sending the ping request comprises sending an Internet Control Message Protocol (ICMP) echo request packet to signal a remote system request (sysrq) event and the command to be performed by the target computing system for the remote sysrq event, and wherein the key of the ping request is used by the target computing system to verify the ping request.

* * * * *